June 16, 1959
D. LINDSAY
2,890,762
AIR FILTERING DEVICE
Filed Jan. 29, 1957
2 Sheets-Sheet 1
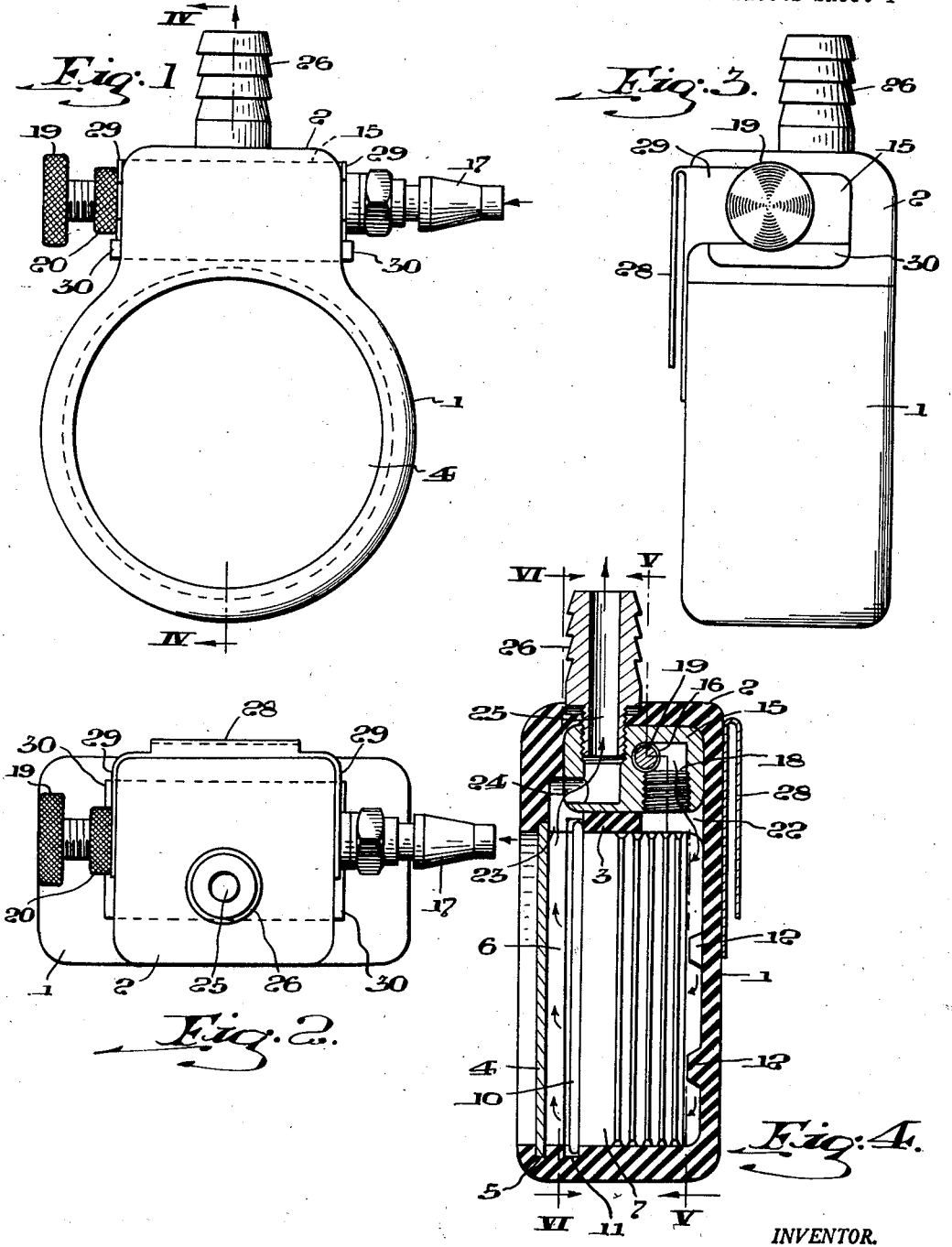
INVENTOR.
DAVID LINDSAY
BY
Brown, Critchlow, Flick & Peckham
ATTORNEYS.

June 16, 1959  D. LINDSAY  2,890,762
AIR FILTERING DEVICE
Filed Jan. 29, 1957  2 Sheets-Sheet 2
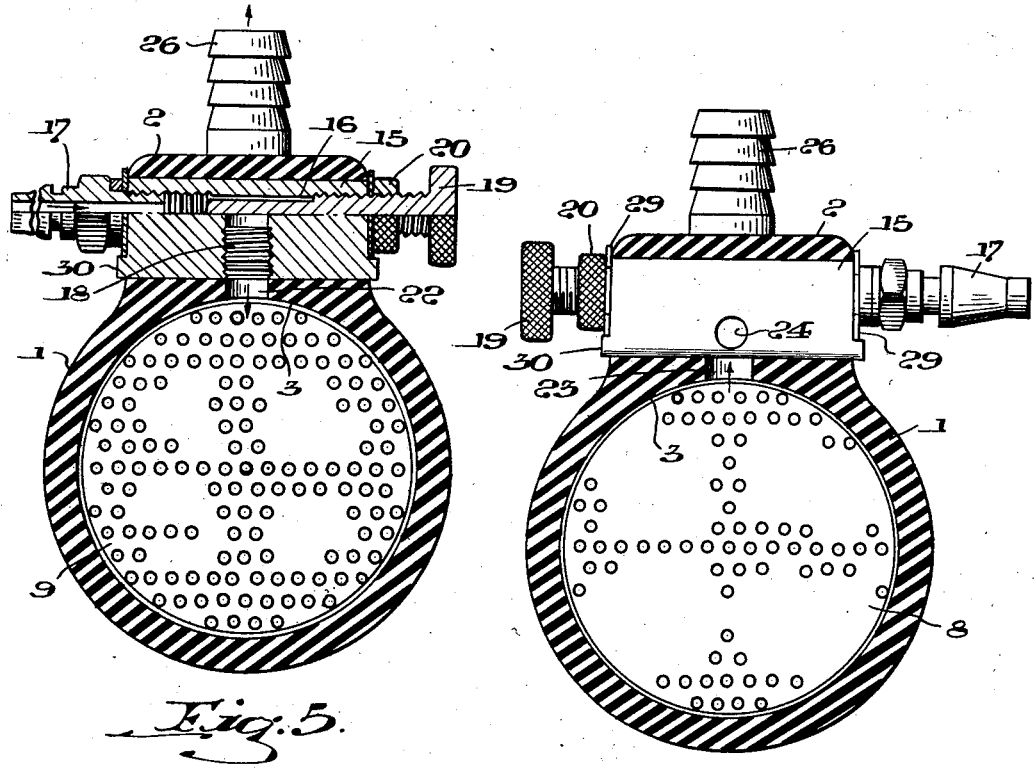
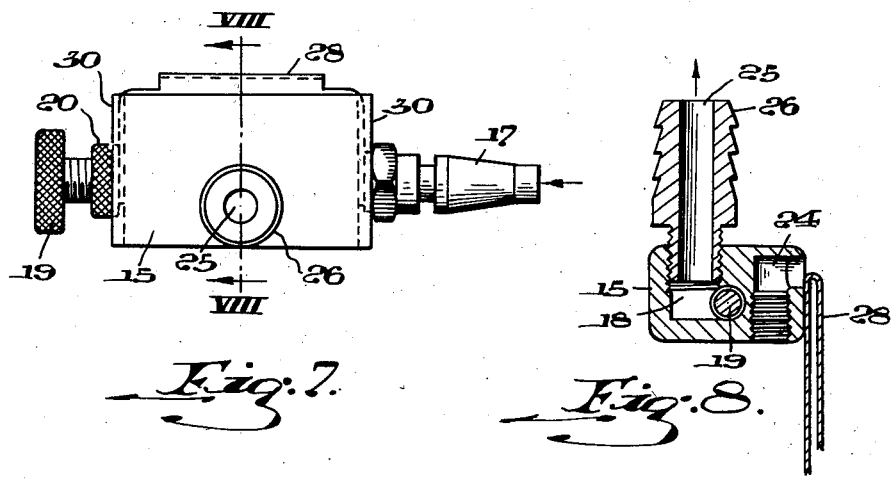
INVENTOR.
DAVID LINDSAY
BY
Brown, Critchlow, Flick & Peckham
ATTORNEYS United States Patent Office 2,890,762
Patented June 16, 1959

2,890,762
AIR FILTERING DEVICE

David Lindsay, Pittsburgh, Pa., assignor to Mine Safety Appliances Company, Pittsburgh, Pa., a corporation of Pennsylvania Application January 29, 1957, Serial No. 636,979

4 Claims. (Cl. 183—40)

This invention relates to air filtering, and more particularly to a device that also controls the flow of air and which can be used with or without a filter.

There are instances where it is desirable to supply air through a hose to a workman wearing a breathing mask. As used herein, "air" means either fresh air or oxygen. Such air may be furnished from a compressed air container or by a compressor. In most cases it is important to provide not only for cleaning the air but also for removing from it vapors and obnoxious odors. Occasionally, filtering means for this purpose forms a part of the apparatus that supplies the air, but generally a separate filter is required.

It is among the objects of this invention to provide a device which filters air being supplied to a breathing mask, which includes a valve for regulating the air supply, and which permits the valve to be used alone when the filter is not necessary.

In accordance with this invention a housing is provided with a closed chamber containing a filter that has an inlet and an outlet spaced from adjacent walls of the housing. The housing also has a portion for receiving a valve body provided with inlet and outlet passages. A partition wall of the housing has inlet and outlet openings connecting the valve passages with the inlet and outlet of the filter. The valve body contains a manually operable valve element controlling the inlet passage. Air delivered to the valve inlet flows through the valve then through the filter and out through the valve to the mask. The valve is removable from the housing, whereupon the outlet of the inlet passage can be connected to the mask so that air will flow only through the inlet passage of the valve and the outlet passage will remain idle.

The preferred embodiment of the invention is illustrated in the accompanying drawings, in which Fig. 1 is a front view of my air filtering device;
Fig. 2 is a plan view;
Fig. 3 is a side view;
Fig. 4 is a vertical cross section taken on the line IV—IV of Fig. 1;
Figs. 5 and 6 are vertical sections taken on the lines V—V and VI—VI, respectively, of Fig. 4;
Fig. 7 is a plan view of the valve alone after it has been inverted; and
Fig. 8 is a cross section of the valve taken on the line VIII—VIII of Fig. 7.

Referring to Figs. 1 to 6 of the drawings, a molded housing is formed from rubber or similar material, so that it will have some flexibility. The housing has a cup-like body 1, on which there is an integral rectangular sleeve 2. The sleeve is separated from the chamber below it by a partition wall 3, which also forms the upper wall of the cup. The front of the cup is closed by a circular plate 4, the edge of which projects into an annular groove 5 (Fig. 4) where it is gripped securely enough to seal the plate in place. Mounted inside the chamber 6 thus formed is an air filter, which preferably is of the cartridge type comprising a hollow sheet metal cylinder 7 filled with suitable filtering and moisture absorbing material that is held in place by perforated metal plates 8 and 9 (Figs. 5 and 6) clamped in the front and back of the cylinder. To position the cartridge in the chamber midway between its rear wall and the front plate, the front of the cartridge may be encircled by a bead 10 that projects into an annular groove 11 in the wall of the chamber, as shown in Fig. 4. Any danger of the cartridge being forced into the chamber past this groove can be avoided by providing the back wall of the chamber with one or more lugs 12 that will engage the back of the cartridge. The space between the back of the cartridge and the back of the chamber forms an inlet space for air, and the space between the front of the cartridge and the front plate forms an outlet space.

In order to direct forced air through the filter and to control its flow, a valve is provided. This valve has a rectangular body 15 that can be slid lengthwise into the sleeve portion 2 of the housing, where it fits snugly in sealing engagement with the walls of the sleeve. As shown in Fig. 5, the valve body is provided with a longitudinal bore 16 extending through it provided with threaded ends. Screwed into one end of the bore is a coupling 17 for quick connection to a fresh air supply, such as a compressor. Midway between its ends the valve body is provided with a threaded vertical opening 18 that extends up from its bottom far enough to open into the longitudinal bore. Air entering the bore through coupling 17 is compelled to leave through the vertical opening because a valve member 19 is screwed into the end of the bore opposite to the coupling. This member can be screwed part or all of the way across the upper end of the vertical opening, but it is slightly smaller in diameter than the longitudinal bore so that air flow can never be shut off completely. A lock nut 20 mounted on the valve can be used for holding the valve member in any desired position.

Air passing through the inlet passage thus formed flows through an opening 22 in housing partition wall 3 and into the inlet space behind the filter. The filtered air leaving the front of the filter flows up through another opening 23 in the partition wall and enters an outlet passage 24 extending into the front of the valve body and then up through its top. The upper end of this passage registers with an opening 25 in the top of the sleeve and is threaded for receiving a coupling 26 adapted to be connected to a flexible hose (not shown) leading to the inlet of a breathing mast. With this construction, the air delivered to the valve through coupling 17 is caused to flow at any desired rate through the filter and then out through the valve to a mask.

This device can be hung on the belt of the user by means of an inverted U-shaped clip 28 that has forwardly projecting prongs 29 which straddle the valve body and engage its opposite ends. The front ends of the prongs are notched to fit around coupling 17 and valve member 19, so that the prongs can be clamped against the valve body by the lock nut 20 and the inlet coupling screwed up tightly against them. To help prevent the clip from tilting up, the lower portion of the valve body may be provided at its opposite ends with narrow flanges 30 that engage the lower edges of the clip prongs.

The filter can be changed by first peeling back the lip of cup 1 so that front plate 4 can be extracted. By then pushing forward on the back of the flexible cup, the filter cartridge can be pushed out of the housing far enough to be grasped in the fingers and pulled out the rest of the way. This procedure is reversed when a new filter is inserted.

As it is not always necessary to filter the incoming air, provision is made for controlling the air supply without the filter. When this is desired, the hose coupling 26 is unscrewed from the top of the valve, and the belt clip 28 is removed by loosening inlet coupling 17 and lock nut 20. Then the valve is pushed lengthwise out of the housing sleeve. After the valve body has been inverted, the hose coupling is screwed into the inlet passage outlet, which is opening 18 that now is at the top of the valve. When air is delivered to the inlet of this passage through coupling 17, it flows out through the hose coupling and directly to the mask. Its flow can be controlled by valve member 19. It will be seen that at such times the outlet passage 24 of the valve performs no function, as both ends are open to the atmosphere.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An air filtering device comprising a housing provided with a valve-receiving portion and a closed filter-receiving chamber separated by a partition wall, a filter in said chamber having an inlet and an outlet spaced from adjacent walls of the chamber to provide inlet and outlet spaces, a valve body secured to said valve-receiving portion and having separate inlet and outlet passages therethrough, each passage having its own inlet and outlet, said partition wall being provided with openings connecting the outlet of said valve inlet passage and the inlet of said outlet passage with said inlet and outlet spaces respectively, and a manually operable valve element controlling said inlet passage.

2. An air filtering device according to claim 1, in which said valve body is removable from said housing for use independently thereof as an air metering valve, with the outlet end of said inlet passage serving as the outlet of the valve.

3. An air filtering device according to claim 2, including a hose coupling normally connected to the outlet end of said valve outlet passage but removable therefrom for connection to the outlet end of said inlet passage when the valve body is removed from said housing.

4. An air filtering device according to claim 1, in which said valve-receiving portion is a sleeve slidably receiving the valve body and provided with an opening registering with the outlet end of said outlet passage, and a hose coupling normally extends through said sleeve opening and is detachably connected with said outlet passage, said coupling being removable and connectible to the outlet end of said inlet passage when the valve body is removed from the sleeve.

References Cited in the file of this patent

UNITED STATES PATENTS

| | | |
|---|---|---|
| 2,112,213 | Schwartz | Mar. 22, 1938 |
| 2,345,530 | Connell | Mar. 28, 1944 |
| 2,506,313 | Mueller | May 2, 1950 |
| 2,642,061 | Boyer | June 16, 1953 |
| 2,701,030 | Hazelton | Feb. 1, 1955 |
| 2,707,051 | Mailhot et al. | Apr. 26, 1955 |